(12) United States Patent
Wang et al.

(10) Patent No.: US 8,310,097 B2
(45) Date of Patent: Nov. 13, 2012

(54) TEMPERATURE-SENSING UNINTERRUPTIBLE POWER SUPPLY SYSTEM AND METHOD FOR CONTROLLING THE SAME

(75) Inventors: Shin-Chuan Wang, Zhong-Ii (TW); Jung-Chi Yang, Zhong-he (TW); Po-Ming Chen, Taipei (TW); Chun-Te Wu, Si-hu Township, Yunlin County (TW)

(73) Assignee: Powercom Co., Ltd. (TW)

( * ) Notice: Subject to any disclaimer, the term of this patent is extended or adjusted under 35 U.S.C. 154(b) by 406 days.

(21) Appl. No.: 12/770,535

(22) Filed: Apr. 29, 2010

(65) Prior Publication Data
US 2011/0266872 A1     Nov. 3, 2011

(51) Int. Cl.
*H02J 7/00* (2006.01)
*H02J 9/00* (2006.01)

(52) U.S. Cl. .......................................... 307/66; 307/86
(58) Field of Classification Search .................. 307/43, 307/64, 65, 66, 86; 700/90; 702/130, 131
See application file for complete search history.

(56) References Cited

U.S. PATENT DOCUMENTS

2008/0231118 A1* 9/2008 Roepke ............................ 307/64
2010/0328080 A1* 12/2010 Tracy et al. ..................... 340/584

* cited by examiner

*Primary Examiner* — Carlos Amaya

(57) ABSTRACT

The present invention discloses a temperature-sensing uninterruptible power supply system and a method for controlling the same. The temperature-sensing uninterruptible power supply system comprises a data processing device, an uninterruptible power supply device, a human temperature sensing module, and a monitoring software; the control method comprises the steps of: the human temperature sensing module detecting a human temperature in a specific distance range; the monitoring software determining whether a user leave from the specific distance range; the uninterruptible power supply device switching to a power-saving mode and commanding the data processing device to shot down; the human temperature sensing module detecting that the user is back to the specific distance range; and restarting the uninterruptible power supply device and commanding the data processing device to reboot.

8 Claims, 5 Drawing Sheets

TEMPERATURE-SENSING UNINTERRUPTIBLE POWER SUPPLY SYSTEM AND METHOD FOR CONTROLLING THE SAME

BACKGROUND OF THE INVENTION

1. Field of the Invention

The present invention relates to an uninterruptible power supply system and a method for controlling the same, and more particularly to an uninterruptible power supply system and a control method which can detect a body temperature.

2. Description of the Prior Art

An uninterruptible power supply (UPS) is a device connected between a power source and a load, wherein the power source can be a commercial AC (alternating current) power supply or a processed AC power. The major function of the UPS is to provide power required by the load urgently for ensuring the normal working of the load when the power source is abnormal.

The working manner of the UPS is that: when the AC power is normal, the UPS provides the commercial AC or processed AC power to the load as well as converts the commercial AC or processed AC power to a DC power for charging a battery which can be used when the power source is interrupted; when the AC power is abnormal, the UPS converts the DC power reserved in the battery to the AC power for the use of load so as to achieve the purpose of power-uninterruptible.

A conventional UPS is able to supply power constantly when a load, such as a computer, is in a working state, and the damage to the computer result from the instability of the AC power can be avoided. However, when a user leaves his seat for a period of time and stops using the computer, the UPS will carry out its working continuously because that the computer is not shut down. As for the conception of energy saving and carbon reduction in recent years, the working manner of the conventional UPS is not conform to the conditions of environment protection.

In view of this, an UPS for actively detecting whether a user leaves or not should be provided, and the UPS is able to determine whether to switch to a power-saving mode for conforming to the anticipation of environment protection.

SUMMARY OF THE INVENTION

In view of the above shortcomings of the prior art, the inventor of the present invention resorted to past experience, imagination, and creativity, performed experiments and researches repeatedly, and eventually devised the present invention—a temperature-sensing uninterruptible power supply system and a method for controlling the same.

The major objective of the present invention is to provide a temperature-sensing uninterruptible power supply system and a method for controlling the same, which can actively detect whether a user leaves a specific distance range and determines whether to switch to a power-saving mode for achieving the effect of power-saving.

Another objective of the present invention is to provide the temperature-sensing uninterruptible power supply system and the method for controlling the same, which can analyze a signal transmitted from an uninterruptible power supply device with a monitoring software, and determine whether the uninterruptible power supply system switch its power supply mode, so as to elevate the whole working efficiency and the accuracy of temperature detecting.

Consequently, the present invention provides a temperature-sensing uninterruptible power supply system, which comprises: a data processing device being powered by an AC (alternating current) power; an uninterruptible power supply device being connected with the data processing device and the AC power, detecting the voltage stability of the AC power, and adjusting the voltage output to the data processing device to a specific range; a temperature-sensing module being connected with the uninterruptible power supply device, detecting a body temperature in a specific distance range, and transmitting the detected body temperature signal to the uninterruptible power supply device; and a monitoring software being installed in the data processing device and determining whether a user is in the specific distance range according to the body temperature signal transmitted from the uninterruptible power supply device so that the uninterruptible power supply device can further determine whether a power-saving mode is switched according to the determining result of the monitoring software.

Furthermore, the present invention provides a method for controlling the temperature-sensing uninterruptible power supply system, and the method comprises the steps of: (1) a temperature-sensing module detecting a body temperature in a specific distance range; (2) the temperature-sensing module transmitting a detected body temperature signal to a uninterruptible power supply device; (3) the uninterruptible power supply device transmitting the body temperature signal to a data processing device; (4) a monitoring software of the data processing device determining whether a user leaves from the specific distance range according to the signal transmitted from the uninterruptible power supply device, if yes, going to step (5), otherwise, going to step (1); (5) the monitoring software transmitting a result of the determination to the uninterruptible power supply device; (6) the uninterruptible power supply device switching to a power-saving mode according to the result of the determination and commanding the data processing device to shut down; (7) the temperature-sensing module detecting the body temperature in the specific distance range continuously and transmitting the detected temperature signals to the uninterruptible power supply device; (8) the uninterruptible power supply device determining whether the user is back to the specific distance range, if yes, going to step (9), otherwise, going to step (7); and (9) restarting the uninterruptible power supply device and commanding the data processing device to reboot, and going to step (1).

DETAILED DESCRIPTION OF THE PREFERRED EMBODIMENTS

To achieve the foregoing objectives and effects, the inventors utilize a temperature-sensing module to detect and analyze a body temperature by cooperating with a monitoring software, and make improvements and modifications to the conventional uninterruptible power supply system, thus achieving a temperature-sensing uninterruptible power supply system and a method for controlling the same of the present invention. Hereinafter, the temperature-sensing uninterruptible power supply system and the method for controlling the same according to a first, a second and a third preferred embodiment of the present invention are described in detail to illustrate the system structure and control methods of the present invention.

Figure 1:
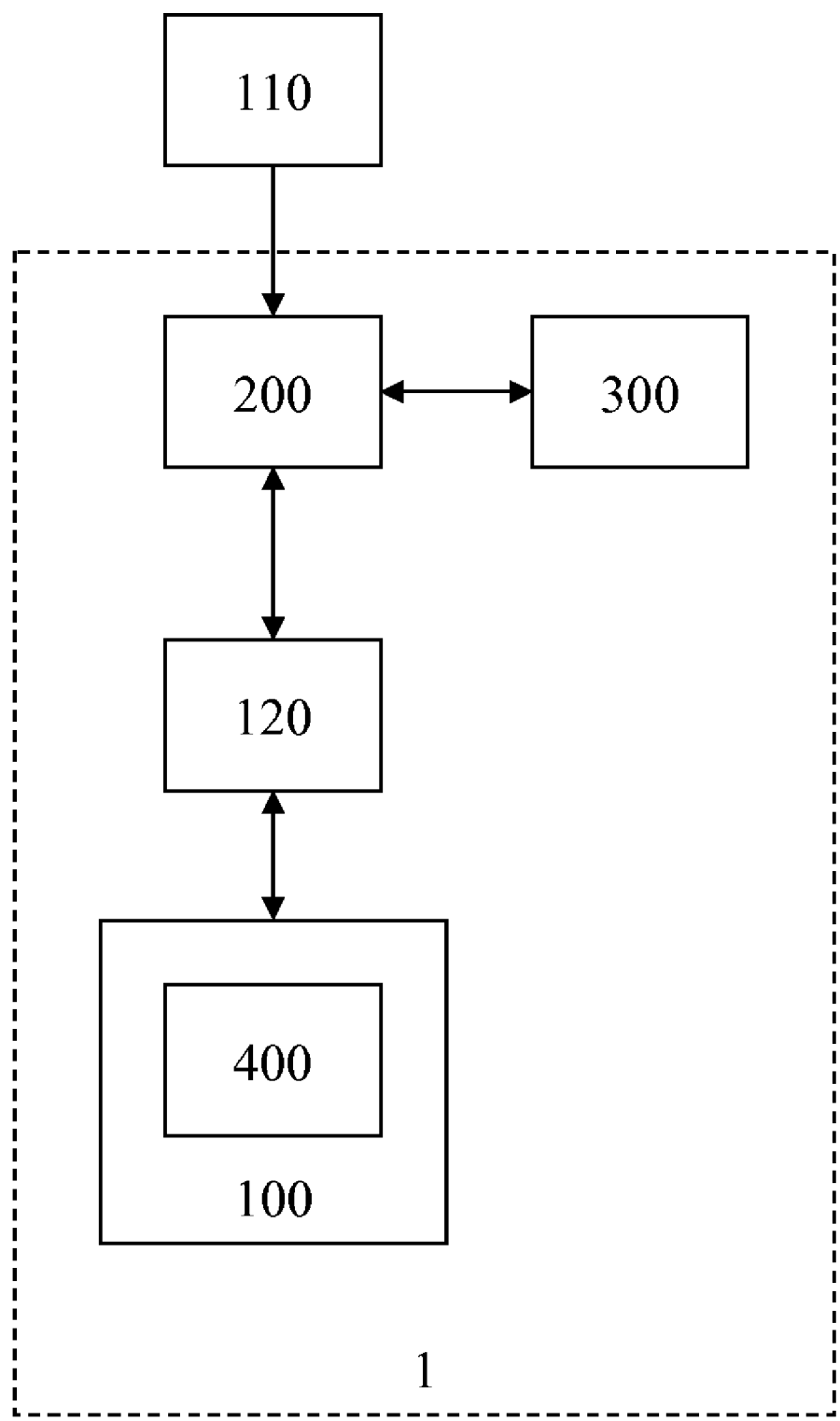
FIG. 1 illustrates an architectural diagram of a temperature-sensing uninterruptible power supply system according to a first preferred embodiment of the present invention.

Referring to FIG. 1, which is the architectural diagram of the temperature-sensing uninterruptible power supply system according to the first preferred embodiment of the present invention. The temperature-sensing uninterruptible power supply system 1 includes a data processing device 100, an uninterruptible power supply device 200, a temperature-sensing module 300, and a monitoring software 400.

The data processing device 100 is powered by an AC (alternating current) power 110, wherein the data processing device 100 is a computer in the first preferred embodiment of the present invention.

The uninterruptible power supply device 200 is connected with the data processing device 100 and the AC power 110, and the uninterruptible power supply device 200 can detect the voltage stability of the AC power 110 and adjust the voltage output to the data processing device 100 to a specific range. The data processing device 100 and the uninterruptible power supply device 200 are connected with each other through a connecting wire 120 which is in the type of RS-232 or universal serial bus (USB).

The temperature-sensing module 300 is connected with the uninterruptible power supply device 200. The temperature-sensing module 300 can detect a body temperature in a specific distance range, and then transmits the detected body temperature signal to the uninterruptible power supply device 200. The temperature-sensing module 300 is a passive infrared (PIR) sensing module which can detect the infra-red irradiated by a body temperature, and a detectable distance range is 1.5 m~2.5 m.

The monitoring software 400 is installed in the data processing device 100, and the monitoring software 400 can be used to determine whether a user is in the specific distance range according to the body temperature signal transmitted from the uninterruptible power supply device 200. The uninterruptible power supply device 200 can further determine whether a power-saving mode is switched according to the determining result of the monitoring software 400.

Figure 2:
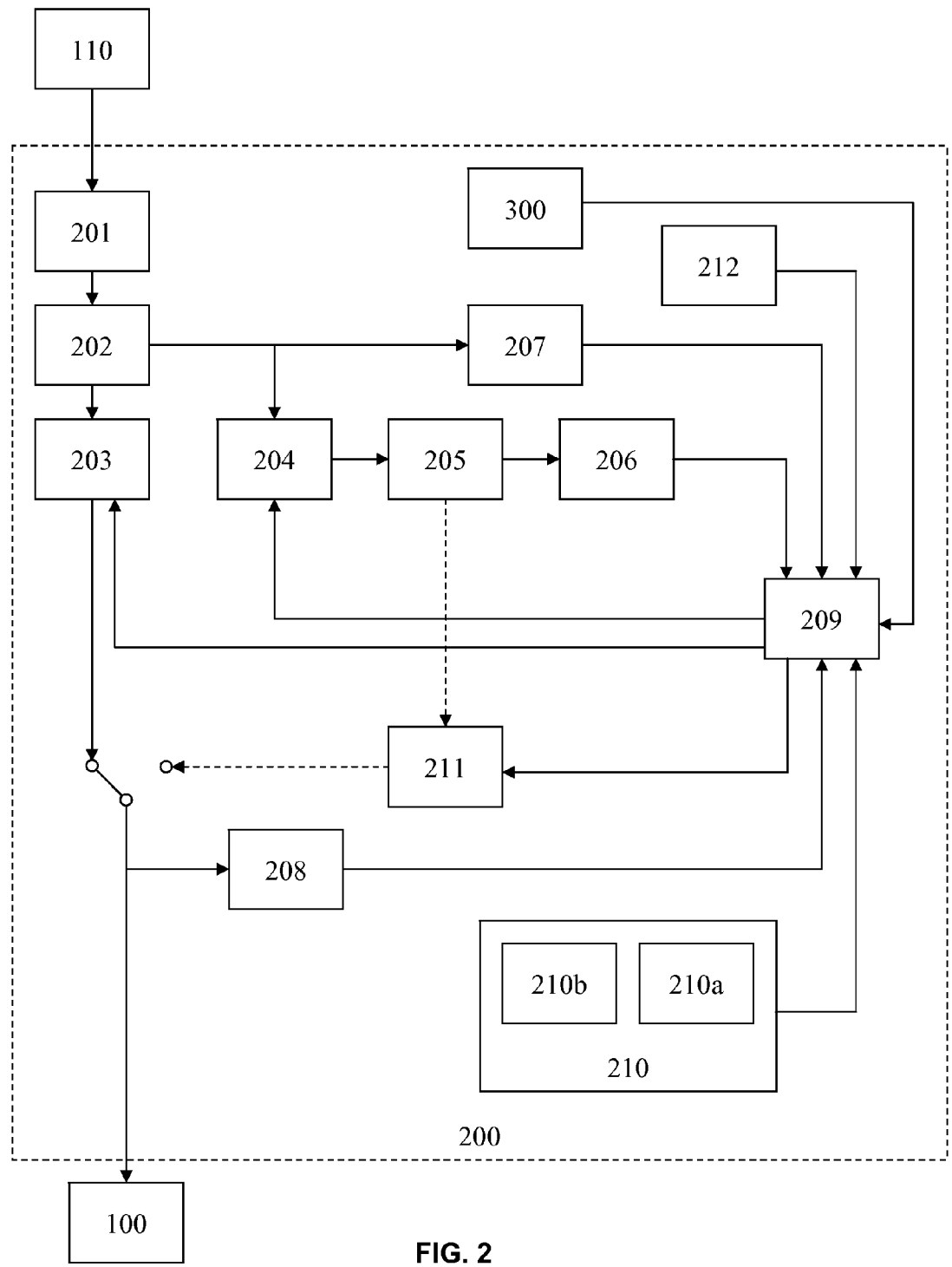
FIG. 2 illustrates an architectural diagram of an inner structure of an uninterruptible power supply device according to the first preferred embodiment of the present invention.

Referring to FIG. 2, which is the architectural diagram of an inner structure of the uninterruptible power supply device according to the first preferred embodiment of the present invention. The uninterruptible power supply device 200 comprises an AC breaker 201, a surge protector 202, a transformer switch 203, a charging module 204, a battery 205, a battery voltage sensor 206, an input power sensor 207, an output power sensor 208, a microcontroller unit (MCU) 209, a plurality of warning module 210, an inverter 211, and a keyboard module 212.

The AC breaker 201 is connected with the AC power 110 and protects the uninterruptible power supply device 200 by a short circuit when an overload happens.

The surge protector 202 is connected with the AC breaker 201 and used for avoiding the damage to the data processing device 100 result from the surge of voltage.

The transformer switch 203 is connected with the surge protector 202, and the transformer switch 203 can regulate and stabilize the voltage so as to output the power into the data processing device 100 through an output circuit.

The charging module 204 is connected with the surge protector 202 and able to receive the AC power 110.

The battery 205 is connected with the charging module 204 and can be charged by the charging module 205 so as to be a reserved power supply.

The battery voltage sensor 206 is connected with the battery 205 and used for detecting the voltage of the battery 205.

The input power sensor 207 is connected with the surge protector 202 and used for detecting the voltage and the frequency of the AC power 110 input into the uninterruptible power supply device 200.

The output power sensor 208 is connected with the output circuit and used for detecting the voltage and the current of the power output from the uninterruptible power supply device 200.

The MCU 209 is the data processing center of the uninterruptible power supply device 200 and connected with the battery voltage sensor 206, the charging module 204, the input power sensor 207, the output power sensor 208, the transformer switch 203, and the temperature-sensing module 300. The MCU 209 can receive signals detected by the input power sensor 207 and the output power sensor 208 for determining whether the AC power 110 is normal or not. The MCU 209 can further control the transformer switch 203 to adjust the outputting voltage and receive the signal detected by the battery voltage sensor 206 so as to control the working state of the charging module 204.

The plurality of warning module 210 is connected with the MCU 209 and able to display the working condition of the uninterruptible power supply device 200. The plurality of warning module 210 include an image-displaying module 210a and a buzzer 210b, however, the plurality of warning module 210 can further include a audio-broadcasting module and a light-projecting module in practice.

The inverter 211 is connected with the MCU 209, wherein the MCU 209 can control the inverter 211 to output the reserved power when the AC power 110 is abnormal.

The keyboard module 212 is disposed on the uninterruptible power supply device 200 and provided for the input of the user on the uninterruptible power supply device 200.

First of all, the AC power 110 passes through the AC breaker 201 and the surge protector 202 in order, and then gets into the inner circuit of the uninterruptible power supply device 200. At this time, the charging module 204 charging the battery 205 with the AC power 110. If the uninterruptible power supply device 200 is not turned on, there is not any voltage output into the data processing device 100; if the uninterruptible power supply device 200 is turned on, the MCU 209 detects the voltage of the battery 205, the voltage and the frequency of the AC power 110 and the voltage and the current of the output power by the battery voltage sensor 206, the input power sensor 207 and the output power sensor 208 respectively. When the AC power 110 is normal, the voltage of the output power and the input power are the same; when the AC power 110 is lower, the MCU 209 elevates the voltage of the output power by controlling the transformer switch 203; when the AC power 110 is higher, the MCU 209 lowers the voltage of the output power by controlling the transformer switch 203 so as to stabilize the voltage of the output power in a specific range. Additionally, if the voltage of the AC power 110 is abnormal, the MCU 209 will control the inverter 211 to output the reserved power until the power of the battery 205 is exhausted, then the uninterruptible power supply device 200 will be shut down.

Figure 3:
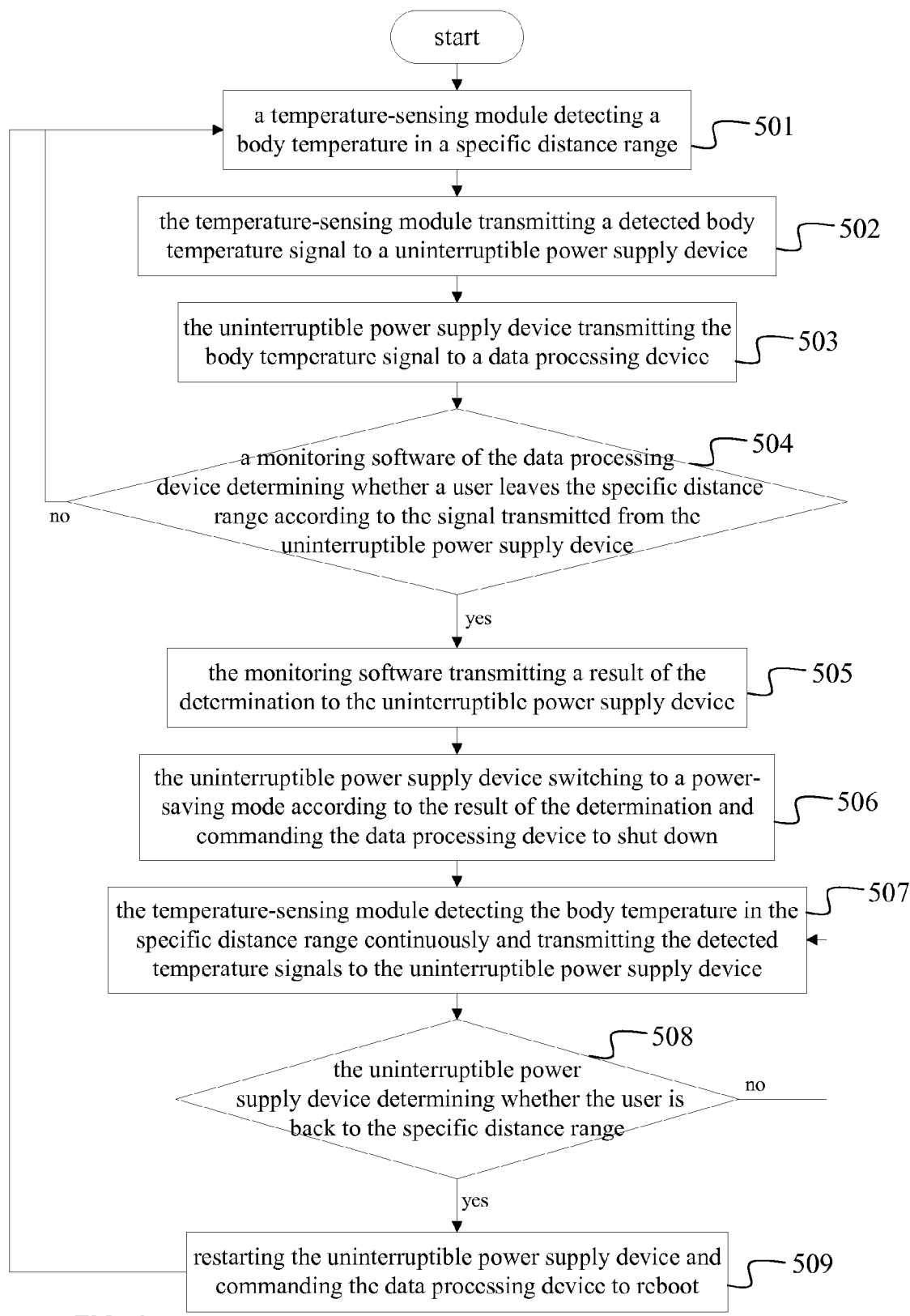
FIG. 3 illustrates a flow chart for controlling the temperature-sensing uninterruptible power supply system according to the first preferred embodiment of the present invention.

Referring to FIG. 3, which is the flow chart for controlling the temperature-sensing uninterruptible power supply system according to the first preferred embodiment of the present invention. The method comprises the steps of: (step 501) a temperature-sensing module detecting a body temperature in a specific distance range; (step 502) the temperature-sensing module transmitting a detected body temperature signal to a uninterruptible power supply device; (step 503) the uninterruptible power supply device transmitting the body temperature signal to a data processing device; (step 504) a monitoring software of the data processing device determining whether a user leaves the specific distance range according to the signal transmitted from the uninterruptible power supply device, if yes, going to step 505, otherwise, going to step 501; (step 505) the monitoring software transmitting a result of the determination to the uninterruptible power supply device; (step 506) the uninterruptible power supply device switching to a power-saving mode according to the result of the determination and commanding the data processing device to shut down; (step 507) the temperature-sensing module detecting the body temperature in the specific distance range continuously and transmitting the detected temperature signals to the uninterruptible power supply device; (step 508) the uninterruptible power supply device determining whether the user is back to the specific distance range, if yes, going to step 509, otherwise, going to step 507; and (step 509) restarting the uninterruptible power supply device and commanding the data processing device to reboot, and going to step 501.

The specific distance range mentioned in the steps 501, 504, 507, and 508 is up to 1.5 m~2.5 m, that is to say, the temperature-sensing module 300 can detect the body temperature in the range about 1.5 m~2.5 m.

Figure 4:
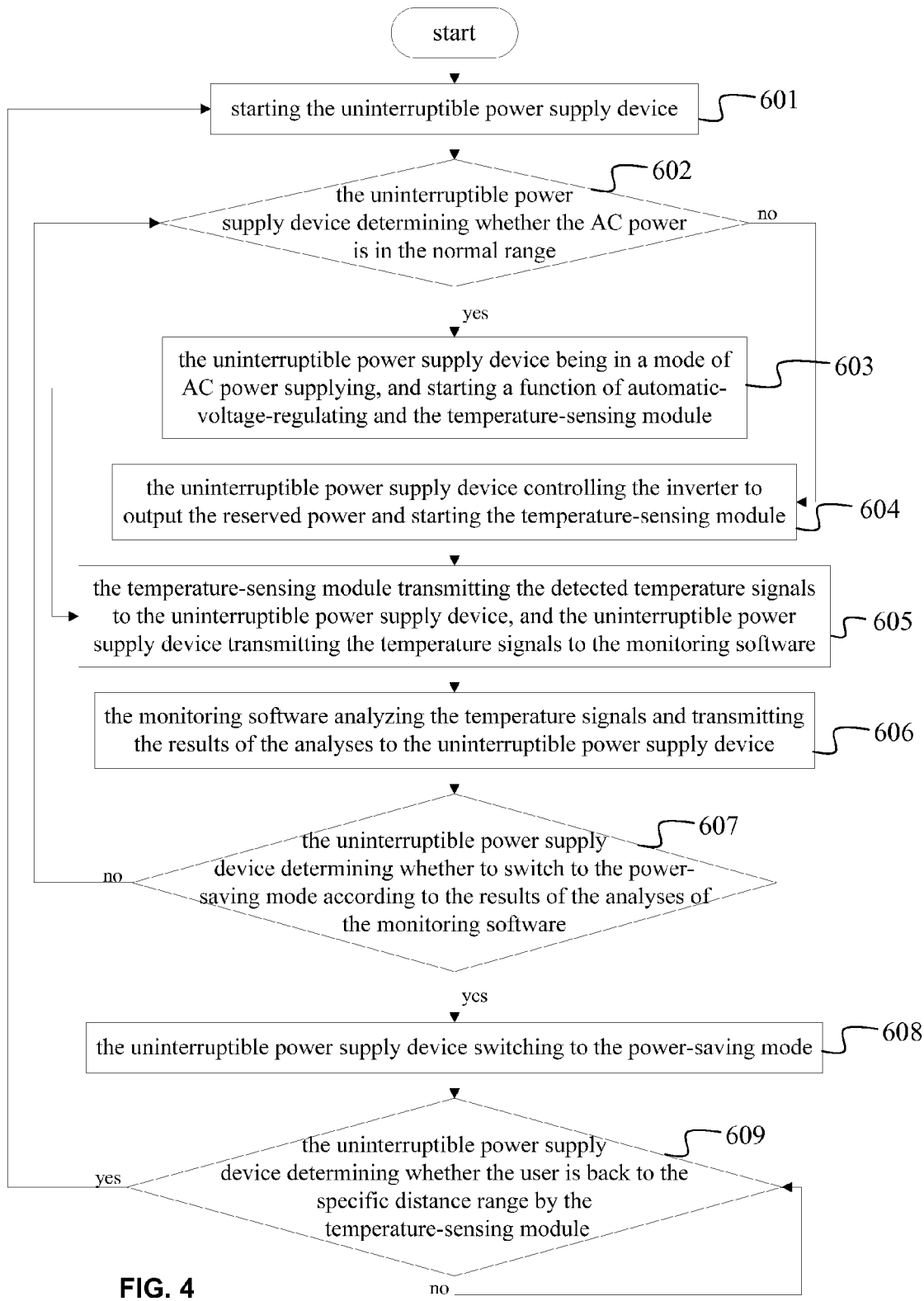
FIG. 4 illustrates a flow chart for controlling the temperature-sensing uninterruptible power supply system according to a second preferred embodiment of the present invention.

Next, the second preferred embodiment of the present invention is introduced. The structure of the second preferred embodiment is substantially the same as the structure of the first preferred embodiment and thus will not be described again here. Referring to FIG. 4, which is the flow chart for controlling the temperature-sensing uninterruptible power supply system according to the second preferred embodiment of the present invention. The method includes the steps of: (step 601) starting the uninterruptible power supply device; (step 602) the uninterruptible power supply device determining whether the AC power is in the normal range, if yes, going to step 603, otherwise, going to step 604; (step 603) the uninterruptible power supply device being in a mode of AC power supplying, and starting a function of automatic-voltage-regulating and the temperature-sensing module, then going to step 605, wherein the function of automatic-voltage-regulating can increase or decrease the output voltage to a specific range; (step 604) the uninterruptible power supply device controlling the inverter to output the reserved power and starting the temperature-sensing module, then going to step 605; (step 605) the temperature-sensing module transmitting the detected temperature signals to the uninterruptible power supply device, and the uninterruptible power supply device transmitting the temperature signals to the monitoring software; (step 606) the monitoring software analyzing the temperature signals and transmitting the results of the analyses to the uninterruptible power supply device; (step 607) the uninterruptible power supply device determining whether to switch to the power-saving mode according to the results of the analyses of the monitoring software, if yes, going to step 608, otherwise, going to step 602; (step 608) the uninterruptible power supply device switching to the power-saving mode; and (step 609) the uninterruptible power supply device determining whether the user is back to the specific distance range by the temperature-sensing module, if yes, going to step 601, otherwise, going to step 609.

Figure 5:
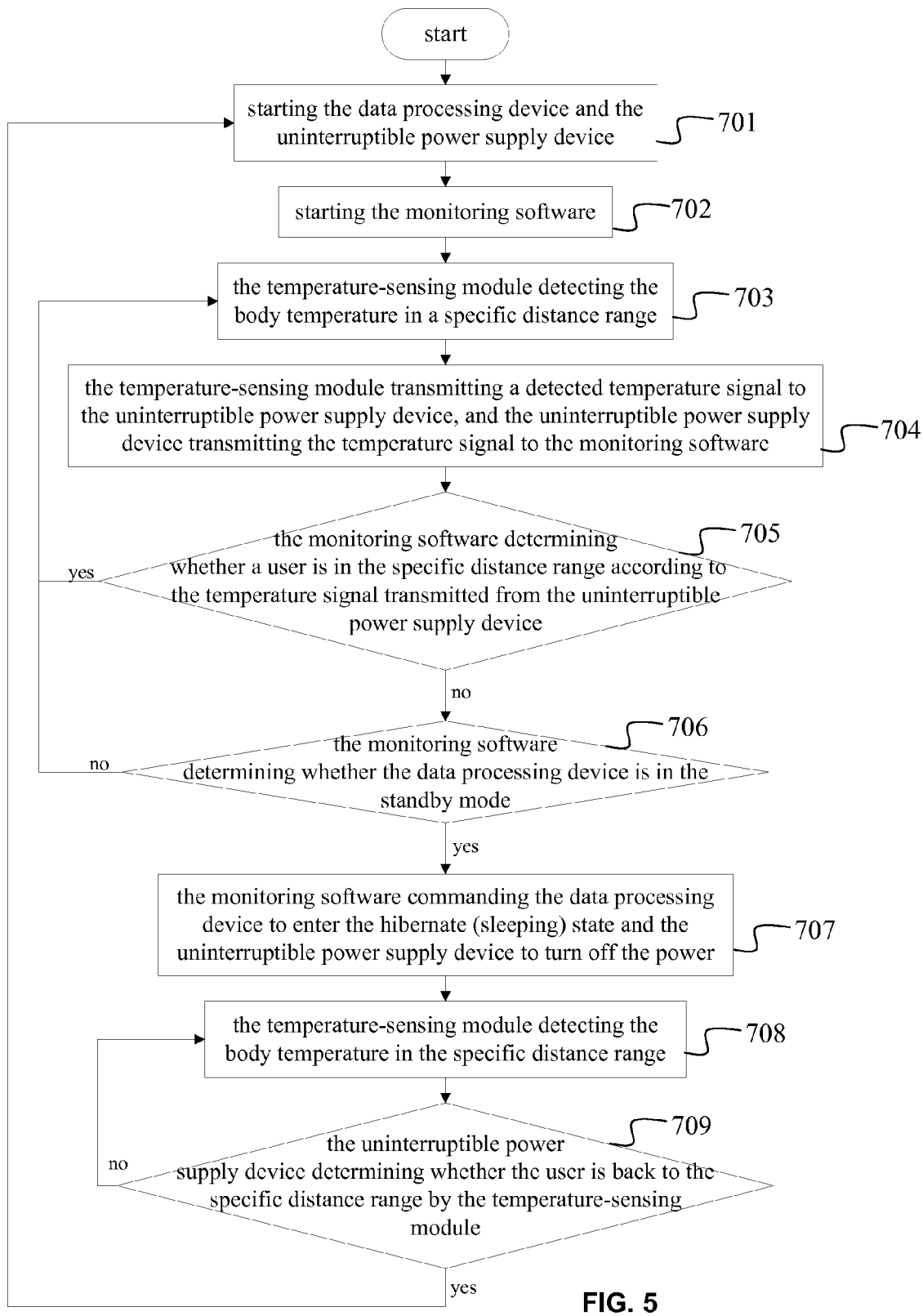
FIG. 5 illustrates a flow chart for controlling the temperature-sensing uninterruptible power supply system according to a third preferred embodiment of the present invention.

Finally, the third preferred embodiment of the present invention is introduced. The structure of the third preferred embodiment is substantially the same as the structure of the first preferred embodiment and thus will not be described again here. Referring to FIG. 5, which is the flow chart for controlling the temperature-sensing uninterruptible power supply system according to the third preferred embodiment of the present invention. The method includes the steps of: (step 701) starting the data processing device and the uninterruptible power supply device; (step 702) starting the monitoring software; (step 703) the temperature-sensing module detecting the body temperature in a specific distance range; (step 704) the temperature-sensing module transmitting a detected temperature signal to the uninterruptible power supply device, and the uninterruptible power supply device transmitting the temperature signal to the monitoring software; (step 705) the monitoring software determining whether a user is in the specific distance range according to the temperature signal transmitted from the uninterruptible power supply device, if yes, going to step 703, otherwise, going to step 706; (step 706) the monitoring software determining whether the data processing device is in the standby mode, if yes, going to step 707, otherwise, going to step 703; (step 707) the monitoring software commanding the data processing device to enter the hibernate (sleeping) state and the uninterruptible power supply device to turn off the power; (step 708) the temperature-sensing module detecting the body temperature in the specific distance range; and (step 709) the uninterruptible power supply device determining whether the user is back to the specific distance range by the temperature-sensing module, if yes, going to step 701, otherwise, going to step 708.

By the detailed description of the overall structure and technical content of the present invention, the following advantages of the present invention can be derived:

The present invention employs a temperature-sensing module to actively detect whether a user leaves a specific distance range and determine whether to switch to a power-saving mode, so as to achieve the effect of power saving.

The present invention utilizes a monitoring software to analyze the signals detected by the temperature-sensing module, and determine whether the uninterruptible power supply device should turn off the power, so as to elevate the whole working efficiency and the accuracy of temperature detecting.

It should be understood that the embodiments of the present invention described herein are merely illustrative of the technical concepts and features of the present invention and are not meant to limit the scope of the invention. Those skilled in the art, after reading the present disclosure, will know how to practice the invention. Various variations or modifications can be made without departing from the spirit of the invention. All such equivalent variations and modifications are intended to be included within the scope of the invention.

As a result of continued thinking about the invention and modifications, the inventors finally work out the designs of the present invention that has many advantages as described above. The present invention meets the requirements for an invention patent, and the application for a patent is duly filed accordingly. It is expected that the invention could be examined at an early date and granted so as to protect the rights of the inventors.

What is claimed is:

1. A temperature-sensing uninterruptible power supply system comprising:
   a data processing device being powered by an AC (alternating current) power;
   an uninterruptible power supply device being connected with the data processing device and the AC power, detecting the voltage stability of the AC power, and adjusting the voltage output to the data processing device to a specific range;
   a temperature-sensing module being connected with the uninterruptible power supply device, detecting a body temperature in a specific distance range, and transmitting the detected body temperature signal to the uninterruptible power supply device; and
   a monitoring software being installed in the data processing device and determining whether a user is in the specific distance range according to the body temperature signal transmitted from the uninterruptible power supply device, so that the uninterruptible power supply device can further determine whether a power-saving mode is switched according to the determining result of the monitoring software.

2. The temperature-sensing uninterruptible power supply system according to claim 1, wherein the uninterruptible power supply device comprises:
   an AC breaker, being connected with the AC power and protecting the uninterruptible power supply device by a short circuit when an overload happens;
   a surge protector, being connected with the AC breaker and used for avoiding damage to the data processing device caused by the surge of voltage;
   a transformer switch, being connected with the surge protector and regulating and stabilizing the voltage so as to output the power to the data processing device through an output circuit;
   a charging module, being connected with the surge protector and able to receive the AC power;
   at least one battery, being connected with the charging module and charged by the charging module so as to be a reserved power supply;
   a battery voltage sensor, being connected with the battery and detecting the voltage of the battery;
   an input power sensor, being connected with the surge protector and detecting the voltage and the frequency of the AC power input into the uninterruptible power supply device;
   an output power sensor, being connected with the output circuit and detecting the voltage and the current of the power output from the uninterruptible power supply device;
   a microcontroller unit (MCU), being the data processing center of the uninterruptible power supply device and connected with the battery voltage sensor, the charging module, the input power sensor, the output power sensor, the transformer switch, and the temperature-sensing module, the microcontroller unit being able to receive signals detected by the input power sensor and the output power sensor for determining whether the AC power is normal or not, controlling the transformer switch to adjust the outputting voltage, and receiving the signal detected by the battery voltage sensor so as to control the working state of the charging module;
   at least one warning module, being connected with the microcontroller unit and displaying the working condition of the uninterruptible power supply device; and
   an inverter, being connected with the microcontroller unit, wherein the microcontroller unit can control the inverter to output the reserved power when the AC power is abnormal.

3. The temperature-sensing uninterruptible power supply system according to claim 2, wherein the warning module is selected from the group consisting of: an image-displaying module, an audio-broadcasting module, a buzzer, and a light-projecting module.

4. The temperature-sensing uninterruptible power supply system according to claim 2, wherein the uninterruptible power supply device further comprises a keyboard module for the input of the user on the uninterruptible power supply device.

5. The temperature-sensing uninterruptible power supply system according to claim 1, wherein the data processing device and the uninterruptible power supply device are connected through at least one connecting wire, which is selected from the group consisting of: RS-232 and universal serial bus (USB).

6. The temperature-sensing uninterruptible power supply system according to claim 1, wherein the temperature-sensing module is a passive infra-red (PIR) sensing module, which can detect the infra-red irradiated by a body temperature.

7. A method for controlling a temperature-sensing uninterruptible power supply system comprising the steps of:
   (1) a temperature-sensing module detecting a body temperature in a specific distance range;
   (2) the temperature-sensing module transmitting a detected body temperature signal to a uninterruptible power supply device;
   (3) the uninterruptible power supply device transmitting the body temperature signal to a data processing device;
   (4) a monitoring software of the data processing device determining whether a user leaves the specific distance range according to the signal transmitted from the uninterruptible power supply device, if yes, going to step (5), otherwise, going to step (1);
   (5) the monitoring software transmitting a result of the determination to the uninterruptible power supply device;
   (6) the uninterruptible power supply device switching to a power-saving mode according to the result of the determination and commanding the data processing device to shut down;
   (7) the temperature-sensing module detecting the body temperature in the specific distance range continuously and transmitting the detected temperature signals to the uninterruptible power supply device;
   (8) the uninterruptible power supply device determining whether the user is back to the specific distance range, if yes, going to step (9), otherwise, going to step (7); and
   (9) restarting the uninterruptible power supply device and commanding the data processing device to reboot, and going to step (1).

8. The method for controlling the temperature-sensing uninterruptible power supply system according to claim 7, wherein the specific distance range in steps (1), (4), (7), and (8) is 1.5 m~2.5 m.

* * * * *